United States Patent
Kato et al.

[11] Patent Number: 5,883,384
[45] Date of Patent: Mar. 16, 1999

[54] ROTATIONAL DISPLACEMENT INFORMATION DETECTION APPARATUS

[75] Inventors: Shigeki Kato, Utsunomiya; Kou Ishizuka, Omiya, both of Japan

[73] Assignee: Canon Kabushiki Kaisha, Tokyo, Japan

[21] Appl. No.: 837,115

[22] Filed: Apr. 14, 1997

[30] Foreign Application Priority Data

Apr. 16, 1996 [JP] Japan .................................. 8-118303
Feb. 15, 1997 [JP] Japan .................................. 9-047397

[51] Int. Cl.$^6$ .................................................. G01D 5/34
[52] U.S. Cl. .............................. 250/231.13; 250/231.14; 250/231.16; 250/237 G; 356/375
[58] Field of Search ....................... 250/231.13–231.18, 250/237 G; 341/13, 31; 356/375, 138

[56] References Cited

U.S. PATENT DOCUMENTS

| | | | |
|---|---|---|---|
| 3,831,024 | 8/1974 | Gill et al. .................................. | 250/229 |
| 4,628,200 | 12/1986 | Tinios .................................. | 250/237 G |
| 4,644,158 | 2/1987 | Taillebois .................................. | 250/239 |
| 4,930,895 | 6/1990 | Nishimura et al. .................... | 356/356 |
| 4,933,673 | 6/1990 | Ishizuka et al. ........................ | 341/13 |
| 4,975,570 | 12/1990 | Nishimura et al. ................. | 250/231.16 |
| 4,979,826 | 12/1990 | Ishizuka et al. ........................ | 356/356 |
| 5,026,985 | 6/1991 | Ishizuka et al. .................... | 250/231.16 |
| 5,038,491 | 8/1991 | Tsukiji et al. ............................. | 33/702 |
| 5,051,579 | 9/1991 | Tsukiji et al. ...................... | 250/231.16 |
| 5,146,085 | 9/1992 | Ishizuka et al. .................... | 250/231.16 |
| 5,159,192 | 10/1992 | Nishimura et al. ................. | 250/231.16 |
| 5,198,873 | 3/1993 | Ishizuka et al. ........................ | 356/356 |
| 5,302,821 | 4/1994 | Igaki et al. ............................ | 250/237 G |
| 5,532,819 | 7/1996 | Ishizuka et al. ........................ | 356/356 |
| 5,537,210 | 7/1996 | Kaneda et al. ......................... | 356/356 |
| 5,552,879 | 9/1996 | Takamiya et al. ................... | 356/28.5 |
| 5,574,559 | 11/1996 | Kaneda et al. ........................ | 356/356 |
| 5,698,849 | 12/1997 | Figueria, Jr. ...................... | 250/231.14 |

*Primary Examiner*—Stephone Allen
*Attorney, Agent, or Firm*—Fitzpatrick, Cella, Harper & Scinto

[57] ABSTRACT

This invention relates to an apparatus for detecting rotational information, and includes a disk attachable to a spindle, with relative rotational information of the disk to be detected. The apparatus also includes a a rotation detection grating on the disk, a main body unit independent from the disk, an optical detection unit fixed in the main body unit, a light source, a reference grating, and a light-receiving element fixed to the optical detection unit. The rotational information of the disk relative to the optical detection unit is detected by the light-receiving element by detecting a light beam which is emitted by the light source and goes via the rotation detection grating and the reference grating. A positioning block for positioning the spindle attachable to the disk is also included. The positioning block has a V-shaped portion which is arranged so that slope surfaces thereof are substantially symmetrical about a line that connects a rotation center of the spindle to be attached to the disk and the optical detection unit. The spindle is positioned by putting the spindle on the V-shaped portion.

25 Claims, 9 Drawing Sheets

ROTATIONAL DISPLACEMENT INFORMATION DETECTION APPARATUS

BACKGROUND OF THE INVENTION

1. Field of the Invention

The present invention relates to a rotational displacement detection apparatus. The present invention is suitable for, e.g., a rotary encoder for detecting relative rotational displacement information between a main scale and a flat board or rotational displacement information of, e.g., an origin position by irradiating a light beam onto a radial grating on the main scale which rotates relatively, and an index scale (radial grating) attached to the flat board, and detecting phase- or intensity-modulated signal light coming from these scales.

In particular, the present invention is suitable for a so-called built-in type rotary encoder in which a disk unit for fixing the main scale is independent from a main body unit for fixing a light source means, a light-receiving means, and the index scale.

2. Related Background Art

Conventionally, as an apparatus for measuring relative rotational displacement information (a displacement amount, velocity, acceleration, or the like) of an object with high precision, a rotary encoder (to be simply referred to as an "encoder" hereinafter) is popularly used. Also, this encoder is added with a means for detecting origin information in order to calculate the absolute position information of rotation information.

FIG. 1 is a schematic sectional view of a conventional encoder.

Referring to FIG. 1, in a detection mechanism of an incremental signal (A and B phases) in the encoder, repetitive radial grating patterns 4 and 4Z of transmission and non-transmission (or reflection and non-reflection) portions are recorded on a main scale 3 fixed to a disk hub 8, which rotates relatively, and radial grating patterns 5A and 5B which have the same pitches as those of the patterns 4 and 4Z and have a spatial phase difference of 90° therebetween are recorded on a stationary flat board (index scale) 5. After the main scale 3 and the index scale 5 are stacked to have a predetermined gap therebetween, a light beam coming from an LED 1 is irradiated onto these scales via a collimator lens 2 as a collimated light beam.

At this time, the amount of transmitted light periodically changes in correspondence with the degree of coincidence between the patterns on the two scales upon movement of the main scale. Changes in light amount at that time are detected by a light-receiving element 6 (6A and 6B) arranged on a base member 9, thus obtaining an electrical incremental signal having a sine waveform. Furthermore, the incremental signal is converted into a rectangular waveform by a binarization circuit, thus obtaining an electrical incremental signal. In this manner, rotation information of a rotation shaft 17 is detected.

On the other hand, in a detection mechanism of an origin signal (Z phase), the radial grating pattern 4Z consisting of a plurality of transmission and non-transmission (or reflection and non-reflection) portions is recorded on the main scale 3 which moves relatively, and a radial grating pattern 5Z which is identical to the pattern 4Z is also recorded on the stationary index pattern 5. After the two scales are stacked to have a predetermined gap therebetween, a collimated light is irradiated onto the two scales. Pulse-shaped signal light, which has a maximum transmitted light amount at an instance when the patterns on the two scales perfectly coincide with each other upon movement of the main scale 3, is obtained. The pulse-shaped signal light is detected by a light-receiving element 6 (6Z) arranged on the base member 9, thereby obtaining an origin signal. Furthermore, the origin signal is converted into a rectangular waveform to obtain an electrical origin signal.

Both the radial grating pattern and origin pattern are formed on each of the main scale 3 and index scale 5 used for detecting relative rotational displacement information. In many cases, both the incremental signal and origin signal are concurrently and parallelly detected using a single optical system. In this case, the detection principles of both the incremental and origin signals use the modulation effect of the transmitted light amount caused by changes in degree of overlapping between the main scale 3 and the index scale 5.

Recent encoders are required to attain a size reduction of the entire apparatus and detection of high-resolution rotational displacement information. In particular, the size reduction requirement requires not only a reduction of the size of the encoder main body but also a reduction of the length in the axial direction after the encoder is attached to a rotary member such as a motor. In order to meet such a requirement, a so-called "built-in type" encoder which does not have any rotation shaft is required. In this encoder, a disk is directly attached to the rotation shaft of, e.g., a motor, and thereafter, the encoder main body is assembled to the motor housing. Also, in this built-in type encoder, the disk (main scale) and the encoder main body (detection head) portion are spatially separated from each other.

When the user (measurement person) attaches such an encoder to, e.g., a motor, a process of fixing the disk to the rotation shaft of the motor and a process of fixing the encoder main body to the motor housing are required.

In this case, in order to accurately output A-, B-, and Z-phase signals from the encoder, the following conditions must be satisfied:

(a-1) the radial grating tracks on the disk do not decenter during rotation of the motor shaft; and (b-2) the radial grating tracks on the disk must perfectly overlap those on a parallel board (index scale) in the encoder main body.

In particular, when the encoder main body is attached to the motor housing, it is difficult, in practice, to form a high-precision fitting butt portion on the motor housing. When the position of the encoder main body is determined to have an intermediate-precision butt relationship and is fixed to the motor housing, a gap of about 100 $\mu$m is formed. As a result, the attachment position of the encoder main body may be displaced by about 50 $\mu$m in the x- or y-axis direction.

A case will be examined below wherein a disk 3 is decentered by 35 $\mu$m in the x-axis direction, and the encoder main body with an index scale 5 is displaced by −50 $\mu$m (a flat board (index scale) 5 is displaced by −50 $\mu$m) in the x-axis direction.

A radial grating 4 on the disk 3 has a radius of 10 mm and a grating pitch of 25 $\mu$m. An amplitude grating 4Z for origin detection, which is defined by random pitches on the disk 3, is assumed to be recorded within the radial position range of 6 to 8 mm. The disk 3 and the flat board 5 are displaced by 85 $\mu$m in the x-axis direction as the sum of the decentering amount of the disk 3 and the attachment position errors of the encoder main body.

If an A-phase signal is detected at the radial position of 10 mm on the disk, the A-phase detection timing shifts by 85/25=3.4 cycles. If a Z-phase signal is detected at the radial position of 7 mm on the disk, the Z-phase detection timing shifts by 85/25×7/10=2.38. The relative phase shift between the A and Z phases is 3.4−2.38=1.02 cycles (note that the A-phase rectangular wave signal is used as a reference for one cycle). More specifically, the Z-phase waveform shifts by ±1.02 cycles or equivalent with respect to the A-phase waveform by the relative displacement of 85 μm in the x-axis direction of the encoder main body and the disk.

In this case, it is difficult to synchronize (lock) the Z and A phases using a logic circuit.

As the disk 3 of the encoder is made compact (to have a smaller diameter) and the resolution becomes higher, the pitches of the radial gratings on the disk 3 and the flat board 5 become very small, and the relative positional displacement (the azimuth shift between the gratings) readily decreases the signal output. As a result, it is very difficult to set the built-in type encoder, and it is also very difficult to put such an encoder into practical applications.

SUMMARY OF THE INVENTION

It is an object of the present invention to provide a rotational displacement information detection apparatus suitable for a built-in type encoder, which can precisely attain positioning in the rotation shaft direction and/or positioning on a plane perpendicular to the rotation shaft, suffers less phase shifts between A- and Z-phase signals, and can precisely detect rotational displacement information.

Other objects of the present invention will become apparent from the following description of the embodiments.

DESCRIPTION OF THE PREFERRED EMBODIMENTS

Figure 1:
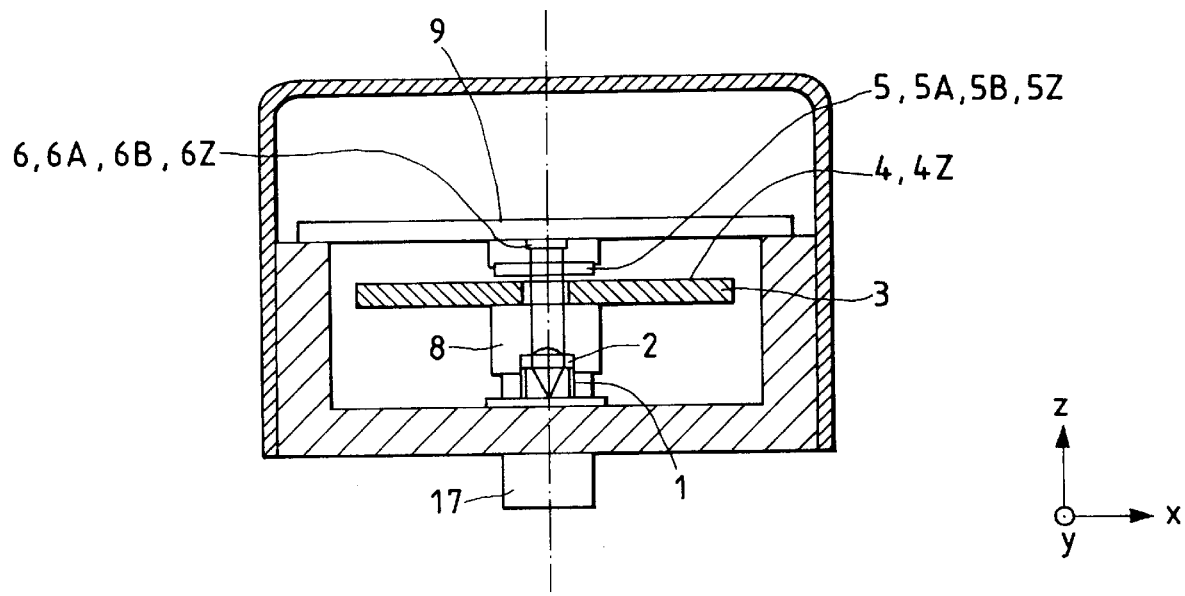
FIG. 1 is a schematic sectional view of a conventional rotary encoder.
Figure 2:
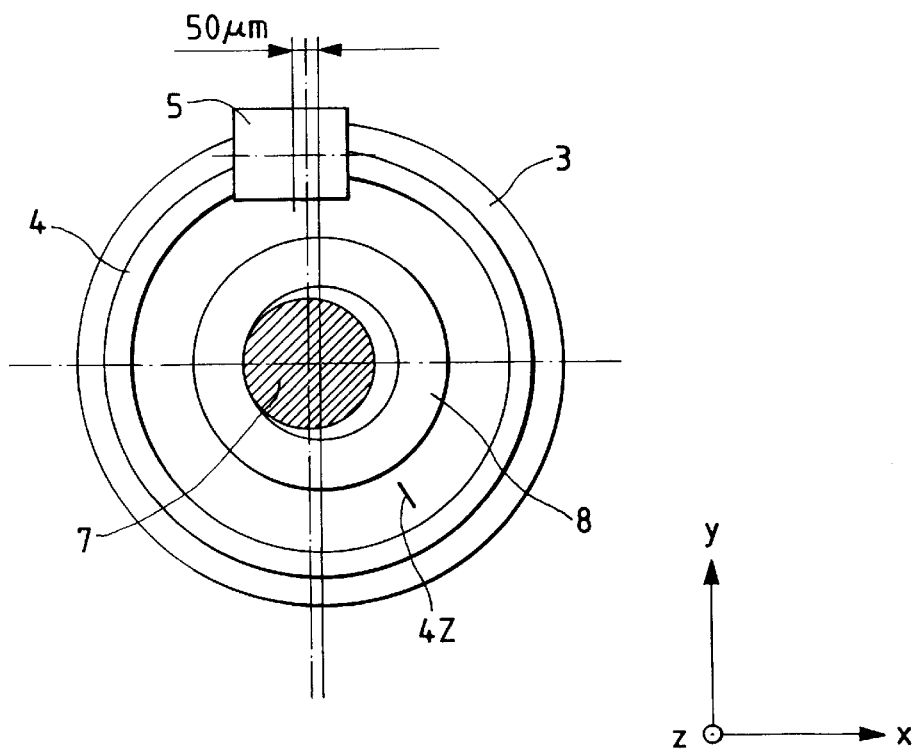
FIG. 2 is a plan view for explaining decentering of a disk and positional displacement of a flat board.
Figure 3:
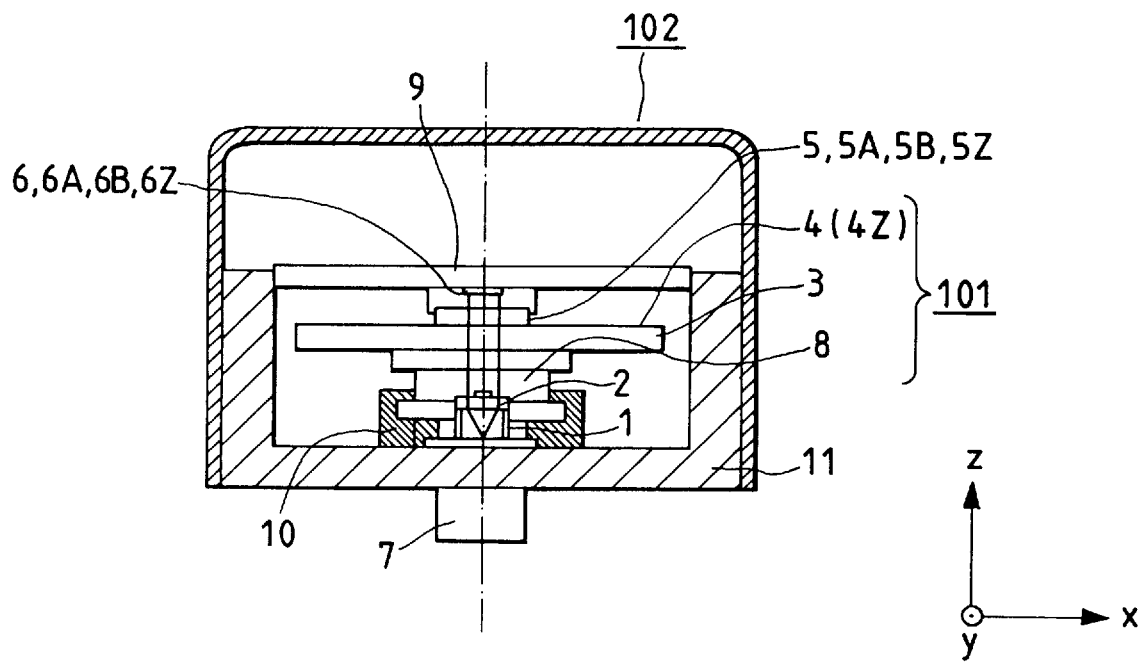
FIG. 3 is a schematic sectional view showing principal part of the first embodiment of the present invention.

FIG. 3 is a schematic sectional view showing a principal part of a rotational displacement information detection apparatus according to the first embodiment of the present invention.

This embodiment exemplifies a so-called built-in type rotary encoder (hereinafter referred to as an encoder). The encoder itself has no rotation shaft, and the measurement person (user) directly attaches a disk 3 to the rotation shaft of, e.g., a motor as the object to be detected.

Referring to FIG. 3, a disk unit 101 has a disk (main scale) 3 and a disk hub 8 that fixes the disk 3. The disk 3 constitutes the main scale by recording a radial grating 4 consisting of about 2,500 transmission and non-transmission slits on a doughnut-shaped region having a radius of 8 to 12 mm, and recording an origin position detection amplitude grating 4Z on a peripheral region different from that of the radial grating 4. The disk hub 8 is fixed to a dummy rotation shaft 7 by a screw in assembly. The dummy rotation shaft 7 is removed from the disk hub 8 after assembly is complete.

An LED 1 serves as a light-emitting element. A collimator lens 2 converts a light beam coming from the LED 1 into a collimated light beam, and inputs it onto the main scale 3. The LED 1 and the collimator lens 2 are constituting elements of a light source means. A flat board (index scale) 5 opposes the main scale 3, and has radial amplitude gratings (hereinafter referred to as gratings) 5A and 5B which have pitches equal to those of the radial grating 4 and have a spatial phase difference of 90° therefrom. The amplitude gratings 5A and 5B modulate light so that transmitted light has a maximum amount when they perfectly overlap the radial grating 4 on the main scale 3; transmitted light has a minimum amount when they overlap each other while being shifted by a ½ pitch. The light beam transmitted through the amplitude gratings 5A and 5B is received by a light-receiving means 6 (to be described later) to obtain incremental signals (A- and B-phase signals).

Also, a radial amplitude grating (hereinafter referred to as a grating) 5Z having the same pattern as that of the amplitude grating 4z is formed on the surface of the flat board 5 to obtain an origin position signal (Z-phase signal) of the rotation of the object to be detected. The grating 5Z modulates light so that transmitted light has a maximum amount when the patterns on the amplitude gratings 4Z and 5Z perfectly match each other; transmitted light has a minimum amount when the patterns on the amplitude gratings 4Z and 5Z are shifted by the grating width or more, thereby obtaining the origin position (Z phase) of the rotation shaft.

A sensor unit (light-receiving means) 6 has three sensors 6A, 6B, and 6Z for respectively detecting A-, B-, and Z-phase signals. The sensor unit 6 is arranged on a sensor board 9. A base member 11 mounts and fixes the elements 1, 2, 5, 6, and 9, and these elements are constituting elements of a main body unit 102. In this embodiment, the encoder has two units, i.e., the main body unit 102 and the disk unit 101.

The method of detecting rotational information of the rotation shaft in the encoder of this embodiment will be explained below.

In this embodiment, a light beam emitted by the LED 1 is converted into a collimated light beam by the collimator lens 2, and the collimated light beam is irradiated onto the radial grating 4 for detecting incremental signals (A and B phases) and the amplitude grating 4Z for detecting an origin signal (Z phase) on the main scale 3. The light beam transmitted through the radial grating 4 and the amplitude grating 5A is received by the sensor 6A to obtain an A-phase signal, the light beam transmitted through the radial grating 4 and the amplitude grating 5B is received by the sensor 6B to obtain a B-phase signal, and the light beam transmitted through the amplitude gratings 4Z and 5Z is received by the sensor 6Z to obtain a Z-phase signal.

More specifically, the sensors 6A and 6B detect changes in light amount for one cycle when the main scale 3 moves relative to the index scale (flat board) 5 by one pitch of the radial grating 4 (amplitude gratings 5A and 5B), and output incremental signals (A and B phases) having a phase difference of 90° therebetween. For example, analog signals output from the sensors 6A and 6B are binarized to obtain A- and B-phase signals. By counting these A- and B-phase signals, the rotational position information of the rotation shaft is obtained. The signals are counted as follows. For example, when the A-phase signal changes from L to H, if the state of the B-phase signal is H, "1" is added to the count value; if the state of the B-phase signal is L, "1" is subtracted from the count value.

The sensor 6Z outputs some small peak waveforms on the two sides of a large peak waveform upon relative rotation of the main scale 3. The half-width of the large peak waveform nearly matches the rotation amount corresponding to the slit width of the amplitude gratings 4Z and 5Z. This signal is binarized at ½ level to obtain a Z-phase signal. The width of the Z-phase rectangular wave signal matches the rotation amount corresponding to the slit width of the amplitude grating 5Z.

Furthermore, in order to count the incremental signals (A and B phases) with reference to this origin signal (Z phase), the incremental signal (A-phase signal) and the origin signal (Z phase) are synchronized. More specifically, the leading and trailing edge timings of the Z-phase signal are perfectly matched with those of the A-phase signals. Since the signal width of the Z-phase signal is roughly determined by the rotation amount corresponding to the slit width of the amplitude grating 5Z, the slit width of the amplitude grating 5Z is set in correspondence with the rotation amount corresponding to one pitch of the radial grating 4, and the width of the Z-phase signal is set to be twice the H-level width of the A-phase signal. Furthermore, the recording positions of the radial gratings 4, 5A, and 5B, and the amplitude gratings 4Z and 5Z are appropriately set, so that the H-level width of the Z-phase rectangular wave signal includes one H-level width of the A-phase rectangular wave signal completely (at its center). Thereafter, the A- and Z-phase signals are logically processed (AND-processed), thereby outputting the origin signal (Z phase) perfectly synchronized with the A phase.

The features in assembly of the disk unit 101 and the main body unit 102 and in attaching the disk unit 101 to the rotation shaft of the object to be measured will be explained below.

In this embodiment, in packing the product, the disk unit 101 and the main body unit 102 are fixed using a V-shaped block 10. In the built-in type encoder like in this embodiment, the measurement person (user) couples the disk unit 101 to the rotation shaft of the object to be measured. In order to synchronize the A- and Z-phase signals of the encoder, decentering of the disk unit 101 and x-axis components of the positional displacement of the flat board 5 must be suppressed. The positional displacement in the x-axis direction is the strictest value, i.e., the smallest allowable error among all the directions.

The assembly method of the built-in type encoder of this embodiment will be described below.

Figure 4A:
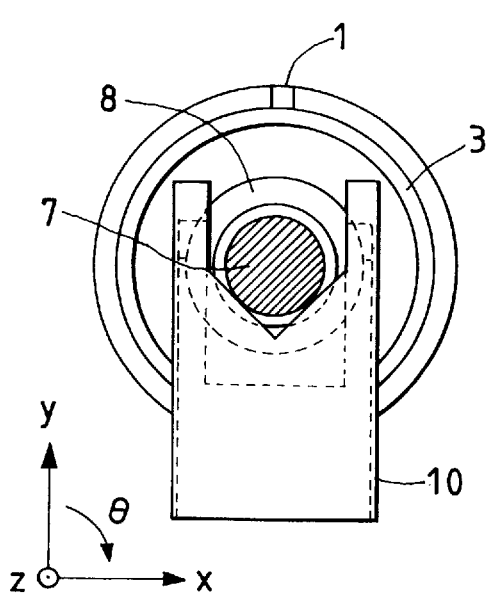
FIGS. 4A and 4B are partially enlarged explanatory view of FIG. 3.

The disk hub 8 is attached to the dummy rotation shaft 7 to adjust decentering of the disk 3. At this time, the disk hub 8 is fixed to the dummy rotation shaft 7 by a screw. As shown in FIG. 4A, the V-shaped block 10 is fixed to the base member 11, and the dummy rotation shaft 7 with the disk unit 101 is butted against the V-shaped wall of a portion 10A (FIG. 4B) of the V-shaped block 10 to determine its position. After the position is determined, the dummy rotation shaft 7 is fixed. At this time, the slope surfaces that form the V shape of the V-shaped block 10 are symmetrical about a line connecting the rotation center of the dummy rotation shaft 7 and the LED 1.

Figure 4B:
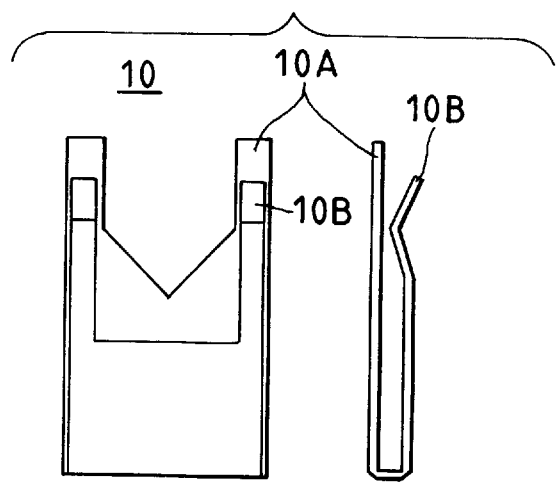

In this case, the disk hub 8 is clamped between resilient portions 10B and the base portions 10A of the V-shaped block 10 with the structure shown in FIG. 4B, and is fixed in position not only in the x-, y-, and θ-directions but also in the z-direction. Also, it is important to set the disk 3 in the rotary phase upon detecting the Z phase, i.e., at the position where the amplitude grating 4Z is detected. In this state, positions, in the x-, y-, and z-directions, of the sensor board 9 that mounts the sensor unit 6 and the flat board 5 provided with the amplitude gratings 5A, 5B, and 5Z are adjusted. Note that the position adjustment mechanism of the sensor board 9 is not shown. After the assembly is complete, the dummy rotation shaft 7 is detached from the disk hub 8, and the encoder except for the dummy rotation shaft is delivered to the measurement person (user).

A case will be explained below wherein the measurement person (user) attaches the encoder to the rotation shaft of the object to be measured and uses it.

Figure 5:
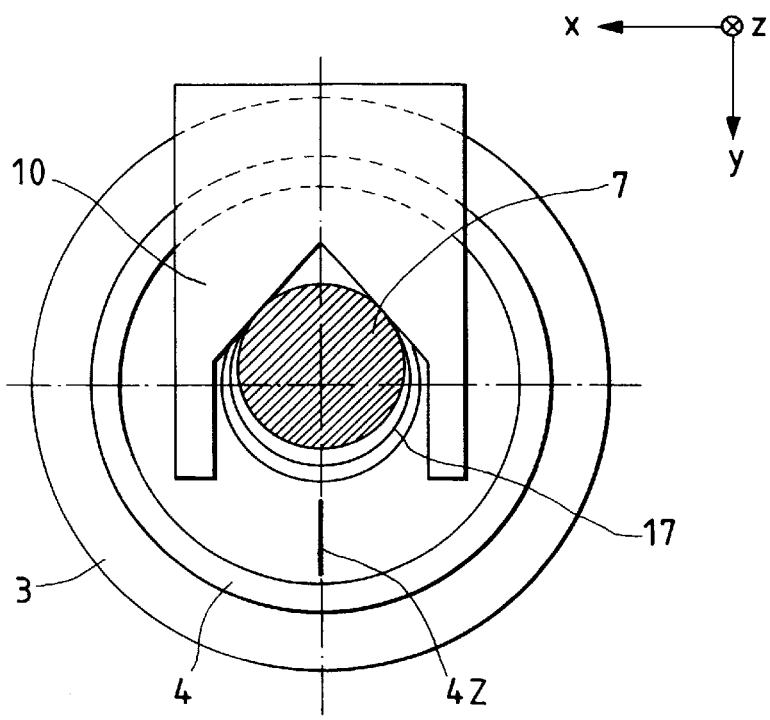
FIG. 5 is an explanatory view showing the effect of a V-shaped block according to the present invention.
Figure 6A:
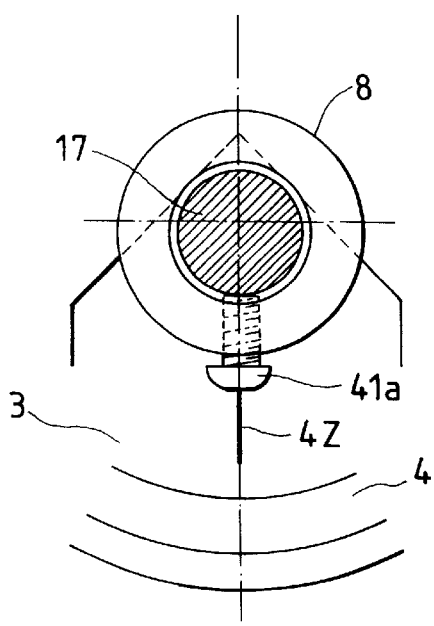
FIGS. 6A and 6B are explanatory views showing the effect, in the screw fastening direction, of a disk hub and a rotation shaft according to the present invention.

Assume that a rotation shaft 17 to which the user attaches the encoder has a shaft diameter different from that of the dummy rotation shaft 7 used upon assembly of the encoder, as shown in FIG. 5. In attaching the encoder, the user attaches the disk hub 8 to the rotation shaft 17 by fixing it from the disk hub 8 side by a screw, as shown in FIG. 6A, and butts the rotation shaft 17 against the V-shaped block 10 fixed to the main body unit 102 of the encoder to determine the relative positions of the disk unit 101 and the main body unit 102. Even when the shaft diameter changes in this manner, if the V shape of the V-shaped block 10 is set to oppose the Z-phase detection direction (y-direction), as shown in FIG. 5, the positional displacement of the rotation center of the disk 3 caused by changes in shaft diameter is produced in only the y-direction but not in the x-direction, and has no influence on synchronizing between the A and Z phases.

Also, as shown in FIG. 6A, since the disk hub 8 is coupled to the rotation shaft 17 from the direction that connects the Z-phase pattern (grating) 4Z and the center of the disk 3, the influence of decentering upon attaching the disk unit 101 appears in only the y-direction independently of synchronizing between the A and Z phases. As described above, in this embodiment, the disk unit 101 is free from any positional displacement in the x-direction when the rotary phase matches the Z-phase detection position, and the A and Z phases are locked stably.

As for the displacement in the y-direction, since the A-, B-, and Z-phase signals need only be prevented from being mixed, a displacement up to 100 μm is allowed if the track width of the radial grating 4 is, e.g., 200 μm. When the rotary phase of the disk 3 matches the Z-phase detection direction, the displacement in the y-direction should be suppressed in term of synchronization between the A and Z phases.

Figure 7:
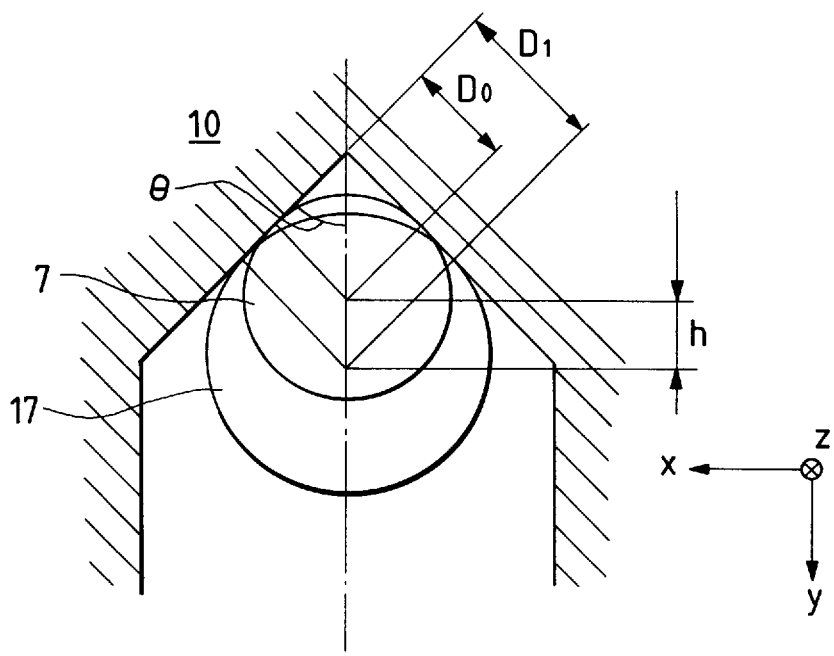
FIG. 7 is an explanatory view showing the positional displacement h in the y-direction upon changes in rotation shaft diameter according to the present invention.

If θ represents the V-shape angle of the V-shaped block 10, as shown in FIG. 7, a displacement h, in the y-direction, of the disk unit 101 is defined by:

$$h=(D_1-D_0)/\sin\theta$$

($D_0$ is the radius of the dummy rotation shaft, and $D_1$ is the radius of the rotation shaft used.)

Since the V-shaped block 10 generally has a V-shape angle θ of 45°, $(D_1-D_0)$ up to about 70 μm is allowed in the case of the V-shaped block with this angle.

In this embodiment, in order to relax the allowable amount of the positional displacement in the y-direction, the V-shape angle is set to be 120°. Table-1 below summarizes the relationship between the V-shape angles and the displacements in the y-direction caused by changes in shaft diameter (displacements are converted with reference to that at a V-shape angle=90°). As the V-shape angle becomes larger, the displacements in the y-direction decrease. However, as the V-shape angle becomes larger, positioning by means of the V-shaped portion becomes harder, and displacements i the x-direction, which should be originally suppressed, may be produced. In view of this problem, in this embodiment, the V-shape angle of the V-shaped block 10 is set to fall within the range from 100° to 130°.

TABLE-1

| V-shape Angle | Displacement in y-direction |
|---|---|
| 90° | 1 |
| 100° | 0.92 |
| 110° | 0.86 |
| 120° | 0.82 |
| 130° | 0.78 |
| 140° | 0.75 |
| 150° | 0.73 |
| 160° | 0.72 |

As shown in FIG. 6A, in this embodiment, the disk hub 8 and the rotation shaft 17 are coupled by a screw 41a from the direction of a line that connects the Z-phase pattern 4Z and the center of the disk 3, i.e., a direction opposing the V-shaped block 10. With this coupling, the butting positional displacement of the V-shaped block 10 caused by changes in shaft diameter and the positional displacement caused by decentering upon coupling the disk hub 8 and the rotation shaft 17 influence in the opposing directions when the rotary phase of the rotation shaft matches the Z-phase detection position, and the allowable amount of changes in shaft diameter is further reduced.

More specifically, the positional displacement in the y-direction, at the Z-phase detection position between the disk 3 and the flat board 5 is:

$$h=(D_1-D_0)\times(1/\sin\theta-1)$$

Figure 6B:
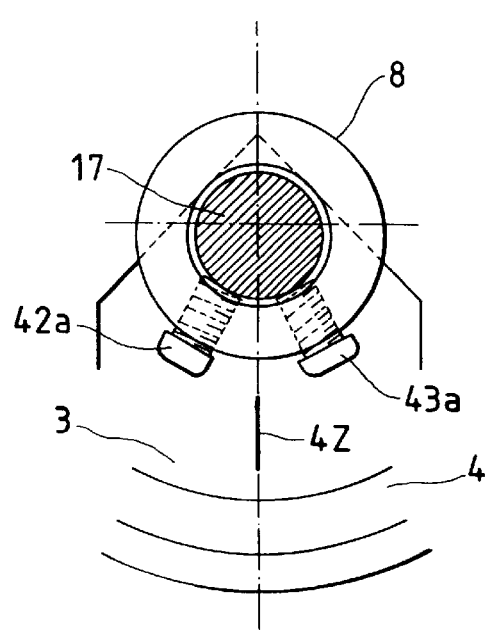

If the allowable amount of the displacement, in the y-direction, of the disk unit 101 is 100 μm above, the shaft diameter is allowed to change by 0.5 mm or more, but this value is impossible in general. Thus, signal quality of the encoder is influenced by only the rotation precision of the rotation shaft to which the user attaches the encoder. As for coupling between the disk hub 8 and the rotation shaft 17, the rotation shaft 17 need only be fixed by a screw to be butted against the wall surface, on the V-shaped block 10 side, of the disk hub 8, and the same effect may be obtained when the rotation shaft 17 is fixed by two screws 42a and 43a that oppose the V-shaped block 10 as shown in FIG. 6B.

Positioning in the z-direction is attained in such a manner that the disk hub 8 is butted against the portion 10A of the V-shaped block 10, and is pressed by the resilient portions 10B of the V-shaped block 10. In the z-direction, the positional precision between the upper surface of the disk 3 and the flat board 5 need be suppressed to about ±30 μm. If errors produced upon assembly of the encoder is suppressed to about ±15 μm, butting the disk hub 8 against the portion 10A of the V-shaped block 10 can sufficiently assure the positional precision of ±15 μm between the upper surface of the disk 3 and the flat board 5. Also, as shown in FIG. 4B, the V-shaped block 10 is constituted by integrating the butting portion, the portion 10A, and the resilient portions 10B, thus decreasing the number of parts.

The second embodiment of a so-called built-in type rotary encoder (to be simply referred to as an encoder hereinafter) as a rotational displacement information detection apparatus will be described below with reference to FIGS. 8 and 9.

Figure 8:
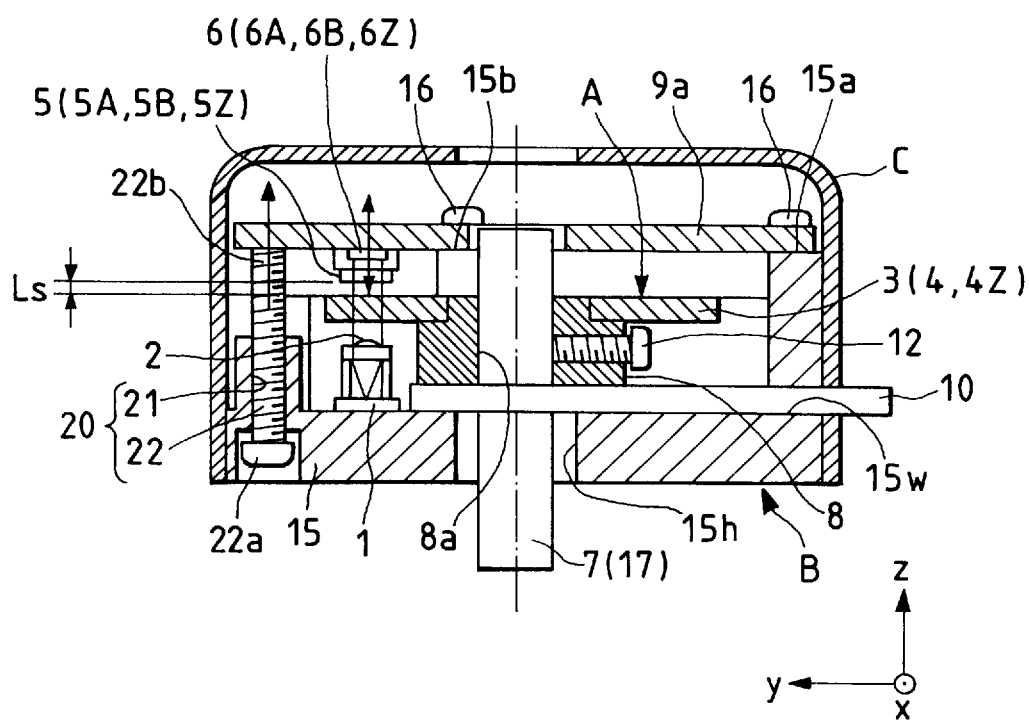
FIG. 8 is a schematic plan view showing an encoder as the second embodiment of a rotational displacement information detection apparatus according to the present invention.

Referring to FIG. 8, the encoder of this embodiment allows high-precision adjustment of the distance between a disk 3 and a flat board 5 in an encoder main body B upon determining the positions of amplitude gratings 4 and 4Z on the disk 3 and amplitude gratings 5A, 5B, and 5Z on the flat board 5.

The encoder of this embodiment comprises a disk unit A and the main body unit B as basic units, as shown in FIG. 8. The encoder itself has no rotation shaft, and the user (measurement person) directly attaches the disk unit A to a coupling shaft (rotation shaft) 17 of, e.g., a motor as the object to be detected, as will be described later. Note that symbol C represents a casing cover of the encoder.

The disk unit A comprises the disk (main scale) 3 and a disk hub 8 integrally fixed to the disk 3, as shown in FIG. 8.

Figure 9:
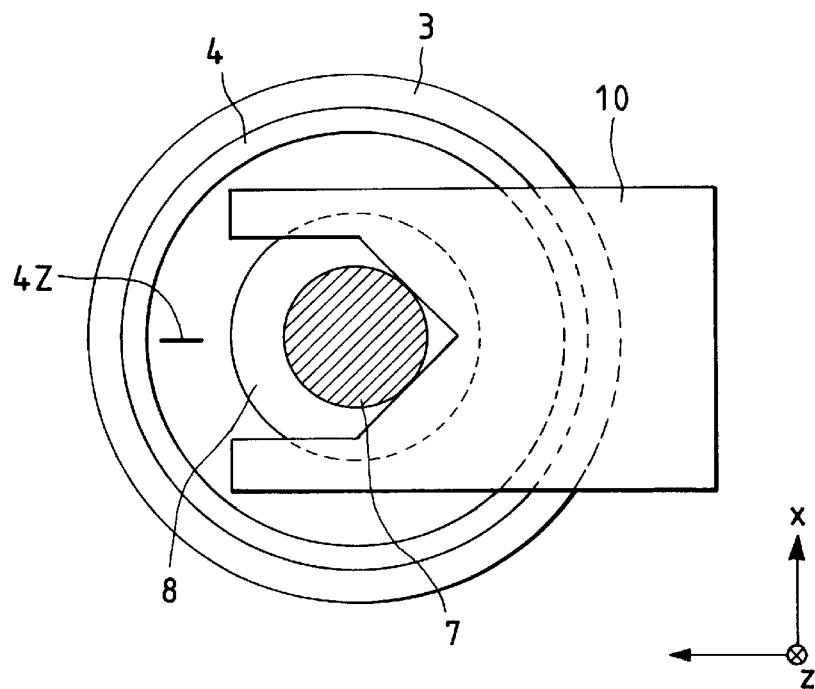
FIG. 9 is an explanatory view showing a state wherein a block member shown in FIG. 8 is butted against a dummy shaft of a disk unit.

The disk 3 forms the main scale by recording the radial amplitude grating (radial grating) 4 consisting of about 2,500 transmission and non-transmission slits on a doughnut-shaped region having a radius of 8 to 12 mm, and recording an origin position detection amplitude grating 4Z on a peripheral region different from that of the radial grating 4 (see FIG. 9).

The disk hub 8 integrally fixed to the disk 3 is formed with a through hole 8a that receives a dummy shaft 7 (to be described later; see FIG. 8). In this disk hub 8, upon attaching the disk unit A to the main body unit B, the dummy rotation shaft (to be referred to as a dummy shaft hereinafter) 7 is inserted into the through hole 8a and is fixed by a set screw 12. The dummy shaft 7 is removed from the disk hub 8 after assembly of the disk unit A and the main body unit B is completed.

As shown in FIG. 8, the main body unit B comprises an LED (light-emitting element) 1, a collimator lens 2, a flat board (index scale) 5, a sensor unit (light-receiving element) 6, a sensor board 9a, and a base member 15. The LED 1 and the collimator lens 2 are constituting elements of a light source means. The collimator lens 2 converts a light emitted by the LED 1 into a collimated light beam, and irradiates it onto the disk 3.

The flat board 5 is arranged on the sensor board 9a, and opposes the disk 3 of the disk unit A. Amplitude gratings 5A, 5B, and 5Z (described below) are recorded on the surface of the flat board 5 to form an index scale.

On the surface of the flat board 5, the radial amplitude gratings (radial gratings) 5A and 5B which have pitches equal to those of the amplitude grating 4 on the disk 3 and have a spatial phase difference of 90° therebetween are recorded.

These amplitude gratings 5A and 5B modulate a light beam from the LED 1 so that transmitted light has a maximum amount when they perfectly overlap the radial grating 4 on the main scale 3; transmitted light has a minimum amount when they overlap each other while being shifted by a ½ pitch. The light beam transmitted through the amplitude gratings 5A and 5B is received by the sensor unit 6 (described below) to obtain incremental signals (A- and B-phase signals).

Also, on the surface of the flat board 5, the amplitude grating 5Z for obtaining an origin position signal (Z-phase signal) of the rotation of the object to be detected is recorded in addition to the above-mentioned amplitude gratings 5A and 5B.

The amplitude grating 5Z modulates a light beam from the LED 1 to decrease transmitted light when it is shifted by the grating width or more from the amplitude grating 4Z on the disk 3. The light beam transmitted through the amplitude grating 5Z is received by the sensor unit 6 (to be described below), thereby obtaining the origin position signal (Z-phase signal) of the rotation shaft.

The sensor unit 6 is arranged on the sensor board 9a, and has three sensors 6A, 6B, and 6Z for respectively detecting A-, B-, and Z-phase signals.

The LED 1, the collimator lens 2, the flat board 5, the sensor unit 6, and the sensor board 9a are fixed at predetermined positions on the base member 15.

The method of detecting rotational displacement information of the rotation shaft in the encoder of this embodiment will be explained below.

In the encoder of this embodiment, a light beam emitted by the LED 1 is converted into a collimated light beam by the collimator lens 2, and the collimated light beam is irradiated onto the amplitude grating 4 for detecting incremental signals (A- and B-phase signals) and the amplitude grating 4Z for detecting an origin signal (Z-phase signal) on the main scale 3.

In this manner, the light beam transmitted through the amplitude gratings 4 and 5A is received by the sensor 6A to obtain an A-phase signal, the light beam transmitted through the amplitude gratings 4 and 5B is received by the sensor 6B to obtain a B-phase signal, and the light beam transmitted through the amplitude gratings 4Z and 5Z is received by the sensor 6Z to obtain a Z-phase signal.

More specifically, the sensors 6A and 6B detect changes in light amount for one cycle when the main scale 3 moves relative to the flat board 5 by one pitch of the amplitude grating 4, and output incremental signals (A and B phases) having a phase difference of 90° therebetween. The analog signals output from the sensors 6A and 6B are binarized to obtain A- and B-phase rectangular wave signals, which are counted to obtain the rotational displacement information of the rotation shaft of the object to be detected. The signals are counted as follows. For example, when the A-phase signal changes from "L" to "H", if the state of the B-phase signal is "H", "1" is added to the count value; if the state of the B-phase signal is "L", "1" is subtracted from the count value.

On the other hand, the sensor 6Z outputs some small peak waveforms on the two sides of a large peak waveform upon relative rotation of the main scale 3. The half-width of the large peak waveform nearly matches the rotation amount corresponding to the slit width of the amplitude gratings 4Z and 5Z. Thus, this signal is binarized at ½ level to obtain a Z-phase rectangular wave signal. The width of the Z-phase rectangular wave signal matches the rotation amount corresponding to the slit width of the amplitude grating 5Z.

Furthermore, in order to count the incremental signals (A- and B-phase signals) with reference to this origin signal (Z-phase signal), the incremental signal (A-phase signal) and the origin signal (Z phase) are syncronized. More specifically, the leading and trailing edge timings of the Z-phase signal are perfectly matched with those of the A-phase signals. This synchronization processing will be described in detail below. As described above, since the signal width of the Z-phase signal is roughly determined by the rotation amount corresponding to the slit width of the amplitude grating 5Z, the slit width of the amplitude grating 5Z is set in correspondence with the rotation amount corresponding to one pitch of the radial grating 4, and the width of the Z-phase signal is set to be twice the "H"-level width of the A-phase signal. Furthermore, the recording positions of the amplitude grating 4 on the disk 3, the amplitude gratings 5A and 5B on the flat board 5, and the amplitude gratings 4Z and 5Z on the disk 3 and the flat board 5 are appropriately set, so that the "H"-level width of the Z-phase rectangular wave signal includes one "H"-level width of the A-phase rectangular wave signal completely (at its center). Thereafter, the A- and Z-phase signals are logically processed (AND-processed), thereby outputting the origin signal (Z phase) perfectly synchronized with the A phase.

In the encoder which detects two different types of signals (incremental signals and origin signal), in order to simplify the assembly process, the disk unit A is built by integrally fixing the disk 3 to the disk hub 8, and the main body unit B is built by fixing the LED 1, the collimator lens 2, the flat board 5, the sensor unit 6, and the sensor board 9a to the base member 15, as described above. The amplitude grating 4 and the origin detection amplitude grating 4Z on the disk 3 are simultaneously illuminated by the single LED 1. Furthermore, the amplitude gratings 5A and 5B and the origin detection amplitude grating 5Z are juxtaposed and recorded on the single flat board 5, and the sensors 6A, 6B, and 6Z for respectively detecting the incremental signals and the origin signal are juxtaposed on the single sensor board 9a.

In the built-in type encoder with the above arrangement, when packing the product, the disk unit A and the main body unit B are fixed using a block member 10, as will be described later. In order to obtain high-precision signal outputs in the assembly state to a rotary member such as a motor, the distance between the disk 3 and the flat board 5 must be maintained at a predetermined design value Ls. For example, in the case of the encoder that uses, as the main scale, the disk 3 on which 2,500 slits are recorded as the radial grating 4 on the doughnut-shaped region at a radius of 8 to 12 mm, the design value Ls between the disk 3 and the flat board 5 must be suppressed to the range of 190 μm±15 μm.

In this embodiment, in order to maintain the distance between the disk 3 and the flat board 5 at the above-mentioned design value Ls, the sensor board 9a as one constituting member of the main body unit B consists of a planar (flat) elastic member of, e.g., a synthetic resin, which can elastically deform to the disk 3 side or the side opposite to the disk 3 side, and an adjustment mechanism 20 for elastically deforming the sensor board 9a from the outside to adjust the distance between the flat board 5 and the disk 3 is arranged on the base member 15.

More specifically, non-contact portions, except for the contact portion of a shaft member 22 (to be described below) of the adjustment mechanism 20, of the sensor board 9a are fixed by screws 16 to upper top surfaces 15a and 15b, which are formed to be flat surfaces parallel to an x-y plane defined by the x- and y-directions, of the upper portions of the base member 15. The height position of the sensor board 9a is adjusted to one that can sufficiently attain a minimum allowable value (15 μm–190 μm) of the design value Ls by elastically deforming the sensor board 9a to the side opposite to the disk 3 side by the shaft member 22 (to be described below) of the adjustment mechanism 20.

The adjustment mechanism 20 has a screw hole 21 which extends through the base member 15 in a direction parallel to the rotation shaft direction (the direction of axial center of the dummy shaft 7) of the disk unit A, and an adjustment screw 22 as a shaft member which is screwed in the screw hole 21. From the bottom surface side of the base member 15, a head portion 22a of the adjustment screw 22 is turned using an operation jig such as a screwdriver to move the adjustment screw 22 forward/backward in the rotation shaft direction of the disk unit A, and a distal end portion 22b projecting from the screw hole 21 of the base member 15 is brought into contact with the rear surface of the sensor board 9a, thereby elastically deforming the sensor board 9a in the z-direction.

In the built-in type encoder with the above-mentioned arrangement, the disk unit A and the main body unit B are assembled in the following procedure.

The dummy shaft 7 is inserted into an insertion hole 15h formed at the center of the base member 15, and the disk hub 8 is attached to the dummy shaft 7. Then, the dummy shaft 7 is temporarily locked to the disk hub 8 by the set screw 12.

The block member 10 is inserted from an insertion port 15w formed at the side wall of the base member 15, and a V-shaped wall formed at the central portion of the distal end of the block member 10 is butted against the dummy shaft 7 (see FIG. 7). In this state, the block member 10 is fixed to the base member 15 by a screw (not shown). At this time, decentering adjustment, on the x-y plane, of the disk 3 is performed so that the amplitude grating 4 on the disk 3 matches the amplitude gratings 5A and 5B on the flat board 5 on the sensor board 9a attached later to the upper top surfaces 15a and 15b of the base member 15 on the x-y plane. The disk 3 in this state is fixed to the disk hub 8. In this case, it is important to set the disk 3 at the rotary phase position upon detecting a Z-phase signal, i.e., at a position where the amplitude grating 4Z on the disk 3 matches the amplitude grating 5Z on the flat board 5 in the rotation shaft direction of the disk unit A.

Subsequently, the set screw 12 is loosened to release temporary locking of the dummy shaft 7. The dummy shaft 7 is moved in the z-direction to butt the lower end face of the disk hub 8 against the upper surface of the block member 10. In this state, the position of the sensor board 9a, to which the flat board 5, the sensor unit 6, and the like are integrally attached, on the x-y plane is adjusted by a position adjustment mechanism (not shown). After the position adjustment, on the x-y plane, of the sensor board 9a, the sensor board 9a is fixed to the upper top surfaces 15a and 15b of the base member 15 by the screws 16.

Thereafter, the adjustment screw 22 is screwed into the screw hole 21 of the base member 15 to bring the distal end portion 22b of the adjustment screw into contact with the rear surface of the sensor board 9a so as to elastically deform the sensor board 9a in the z-direction, thereby adjusting the distance between the disk 3 and the flat board 5 to be the design value Ls. After the distance between the disk 3 and the flat board 5 is adjusted, a lid member that makes the rotation of the adjustment screw 22 impossible is attached to the base member 15 as needed.

Finally, the casing cover C is covered on the base member 15, thus completing assembly of the disk unit A and the main body unit B.

The encoder that completes assembly of the disk unit A and the main body unit B is delivered to the user after the dummy shaft 7 is detached from the disk hub 8.

The encoder assembled in this manner is delivered to the user while preserving an optimal positional relationship between the disk unit A and the main body unit B.

A case will be explained below wherein the user attaches the encoder to the coupling shaft (rotation shaft) of the object to be measured such as a motor and uses it. Note that the coupling shaft to which the user attaches the encoder has a shaft diameter different from that of the dummy shaft 7 used upon assembly of the encoder.

First, a coupling shaft 17 is inserted into the through hole 8a of the disk hub 8 via the insertion hole 15h of the base member 15 to press the disk hub 8 against the upper surface of the block member 10. In this state, the set screw 12 is fastened to fix the coupling shaft 17 to the disk hub 8.

The position, on the x-y plane, of the coupling shaft 17 is determined by the V-shaped wall of the block member 10, and the main body unit B of the encoder and the object to be detected such as a motor are coupled and fixed to each other using a coupling/fixing tool (not shown).

Finally, the block member 10 is removed from the insertion port 15w of the base member 15, thus completing coupling between the encoder and the object to be detected.

In the encoder of this embodiment, since the positional relationship between the disk unit A and the main body unit B, which has been optimally adjusted during the assembly process of the disk unit A and the main body unit B, can be maintained by the adjustment mechanism 20 and the block member 10, the optimal positional relationship between the disk unit A and the main body unit B can be maintained even in the coupling process to the object to be detected by the user.

Furthermore, the distance between the disk 3 in the disk unit A and the flat board 5 in the main body unit B is adjusted by elastically deforming the sensor board 9a, which is elastically deformable to the disk 3 side or the side opposite to the disk 3 side, in the z-direction by the adjustment screw 22 of the adjustment mechanism 20. Accordingly, the distance between the disk 3 and the flat board 5 can be adjusted with high precision.

Also, since the distance between the disk 3 and the flat board 5 can be adjusted with high precision by means of the elastically deformable sensor board 9a and the adjustment mechanism 20, the shape precision of mechanical parts such as the disk hub 8, base member 15, block member 10, and the like, that influence distance precision between the disk 3 and the flat board 5, need not be strictly defined, thus attaining a cost reduction of these mechanical parts.

Even upon coupling the encoder to the object to be detected by the user, the coupling shaft 17 need only be fixed to the disk hub 8 by fastening the set screw 12 without requiring any adjustment between the disk unit A and the main body unit B, i.e., coupling of the encoder to the object to be detected can be complete by a simple operation, thus facilitating coupling to the object to be detected.

An encoder of the third embodiment will be described below with reference to FIG. 10.

The encoder of this embodiment has substantially the same arrangement as that of the encoder of the second embodiment, except that the upper top surfaces 15a and 15b of the base member 15 in the main body unit B are formed as inclined surfaces, each of which has an inclination θ toward the interior of the main body unit B with respect to the x-y plane, and the sensor board 9a is fixed by screws 16 to these upper top surfaces 15a and 15b.

Figure 10:
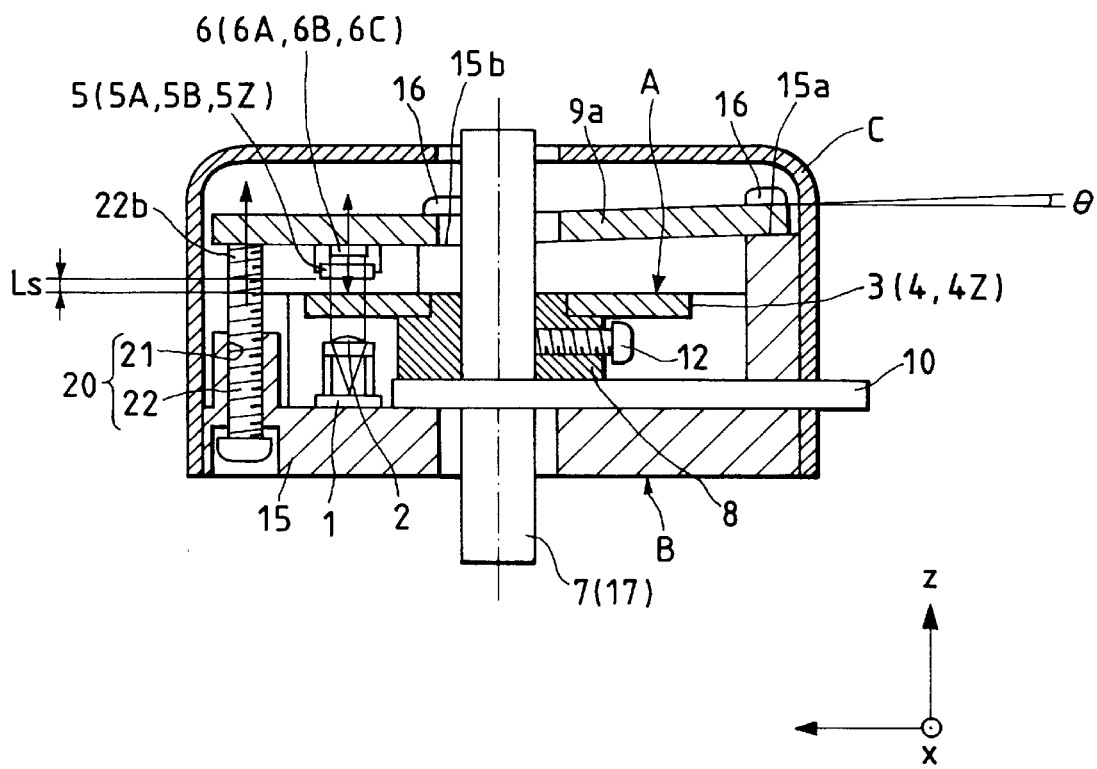
FIG. 10 is a schematic sectional view showing an encoder as the third embodiment of a rotational displacement information detection apparatus according to the present invention.

In the encoder with this arrangement, as shown in FIG. 10, since the distance between the disk 3 in the disk unit A and the flat board 5 in the main body unit B is adjusted by elastically deforming the sensor board 9a in the z-direction by the distal end portion 22b of the adjustment screw 22 of the adjustment mechanism 20, as in the encoder of the second embodiment, for example, even when the upper top surfaces 15a and 15b of the base member 15 in the main body unit B are formed as inclined surfaces, as described above and the sensor board 9a cannot be attached to be parallel to the x-y plane, the distance between the disk 3 and the flat board 5 can be precisely adjusted to the design value Ls by elastically deforming the sensor board 9a in the z-direction by the adjustment screw 22 of the adjustment mechanism 20.

Therefore, in the encoder of this embodiment, in addition to the effects of the encoder of the second embodiment described above, i.e., the effect of maintaining an optimal positional relationship between the disk unit A and the main body unit B, the effect of facilitating coupling to the object to be detected, and the like, even when the sensor board 9a cannot be attached to be parallel to the x-y plane, the distance between the disk 3 and the flat board 5 can be adjusted with high precision.

An encoder of the fourth embodiment will be described below with reference to FIG. 11.

The encoder of this embodiment has substantially the same arrangement as that of the encoder of the second embodiment, except that the adjustment mechanism 20 has an arrangement as described below. That is, in the adjustment mechanism 20 according to this embodiment, the adjustment screw 22 is screwed into a screw hole (not shown) formed in the sensor board 9a until its distal end portion 22b appears from the other side of the hole, and a nut member 23 as a holding member threadably engages with the distal end portion 22b to be in contact with the sensor board 9a, thereby holding the sensor board 9a at a predetermined position.

Figure 11:
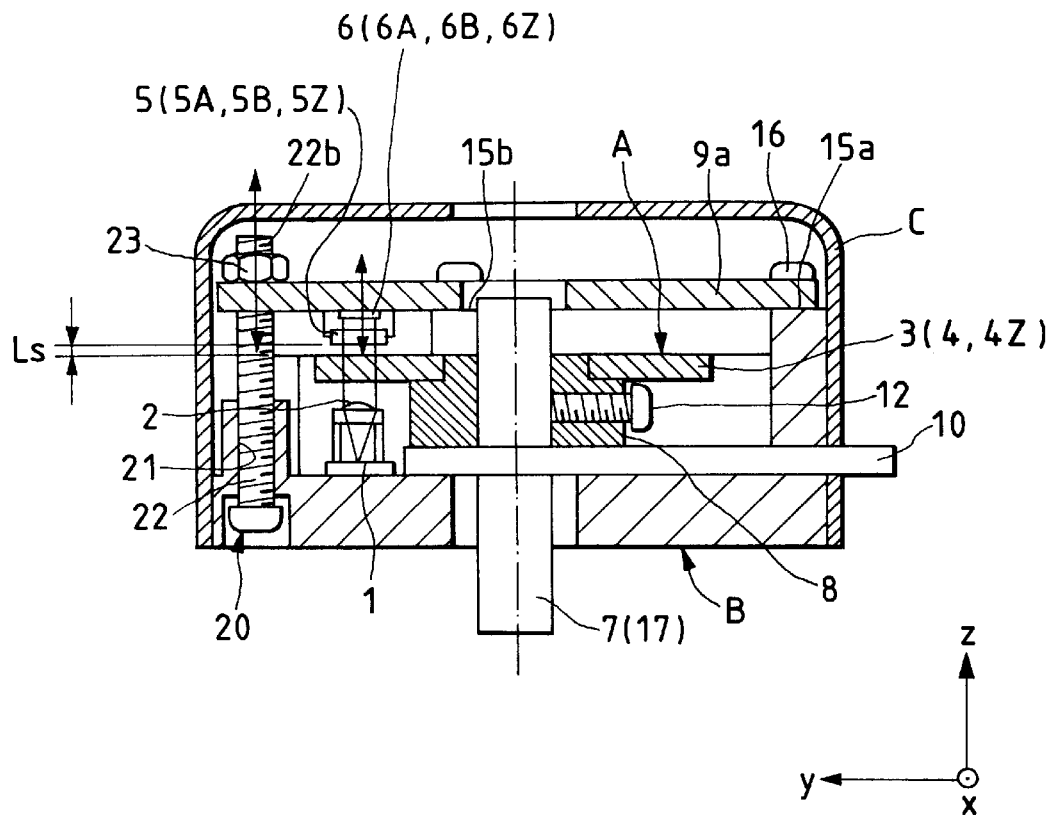
FIG. 11 is a schematic sectional view showing an encoder as the fourth embodiment of a rotational displacement information detection apparatus according to the present invention.

In the encoder with this arrangement, as shown in FIG. 11, the adjustment screw 22 of the adjustment mechanism 20 is moved forward/backward in the rotation shaft direction of the disk unit A to elastically deform the sensor board 9a in the z-direction or the direction opposite to the z-direction, thereby adjusting the distance between the disk 3 in the disk unit A and the flat board 5 in the main body unit B. For example, even when the upper top surfaces 15a and 15b of the base member 15 in the main body unit B are formed at positions slightly higher or lower than defined positions, the sensor board 9a can be elastically deformed in the z-direction or the direction opposite to the z-direction (the rotation shaft direction of the disk unit A) by the nut member 23 that threadably engages with the distal end portion 22b of the adjustment screw 22 of the adjustment mechanism 20. Hence, the distance between the disk 3 and the flat board 5 can be adjusted to the design value Ls with high precision.

Therefore, in the encoder of this embodiment, in addition to the effects of the encoder of the second embodiment described above, i.e., the effect of maintaining an optimal positional relationship between the disk unit A and the main body unit B, the effect of facilitating coupling to the object to be detected, and the like, even when the upper top surfaces 15a and 15b of the base member 15 in the main body unit B are formed to have positions slightly higher or lower than the prescribed positions, as described above, the distance between the disk 3 and the flat board 5 can be adjusted with high precision.

In this embodiment, the adjustment mechanism 20 is constituted by the adjustment screw 22 which has a male screw portion over its total length, and the nut member 23 which threadably engages with the distal end portion 22b of the adjustment screw 22 to elastically deform the sensor board 9a by forward/backward movement of the adjustment screw 22. Alternatively, the distal end portion 22b of the adjustment screw may be formed to have a rod shape having a diameter smaller than that of the male screw portion, and may be locked by snapping a stopper having a substantially C plan shape onto the rod-shaped distal end portion, so as to elastically deform the sensor board 9a in the z-direction or the direction opposite to the z-direction by the stopper by means of forward/backward movement of the adjustment screw 22, thus obtaining the same effect as described above.

As described above, with the built-in type encoders of the second to fourth embodiments, even when the disk 3 in the disk unit A is made compact (to have a smaller diameter) and has a higher resolution, the distance between the disk 3 and the flat board 5 can be adjusted with high precision by the adjustment screw of the adjustment mechanism 20 using elastic deformation of the sensor board 9a. Therefore, a high-performance, low-cost built-in type rotational displacement information detection apparatus which allows easy assembly and has a small number of parts can be realized.

An encoder of the fifth embodiment will be described below with reference to FIGS. 12 to 17.

The encoder of this embodiment can easily attain, with high precision, positioning of the disk unit A in the rotation shaft direction with respect to the main body unit B and positioning of the disk unit A in a plane direction (x-y plane direction) perpendicular to the rotation shaft direction.

In the encoder of this embodiment, the same reference numerals denote parts common to those in the encoder of the second embodiment, and a detailed description thereof will be omitted. Also, the method of detecting rotational displacement information of the rotation shaft is the same as that in the encoder of the second embodiment, and a detailed description thereof will be omitted.

Figure 12:
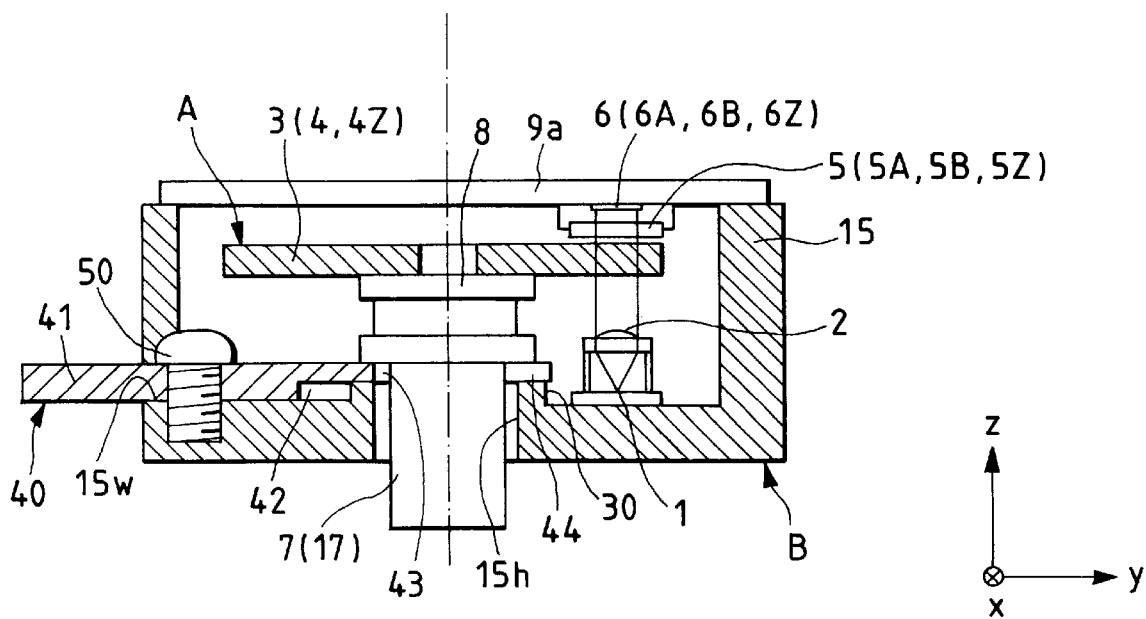
FIG. 12 is a schematic sectional view showing an encoder as the fifth embodiment of a rotational displacement information detection apparatus according to the present invention.
Figure 13:
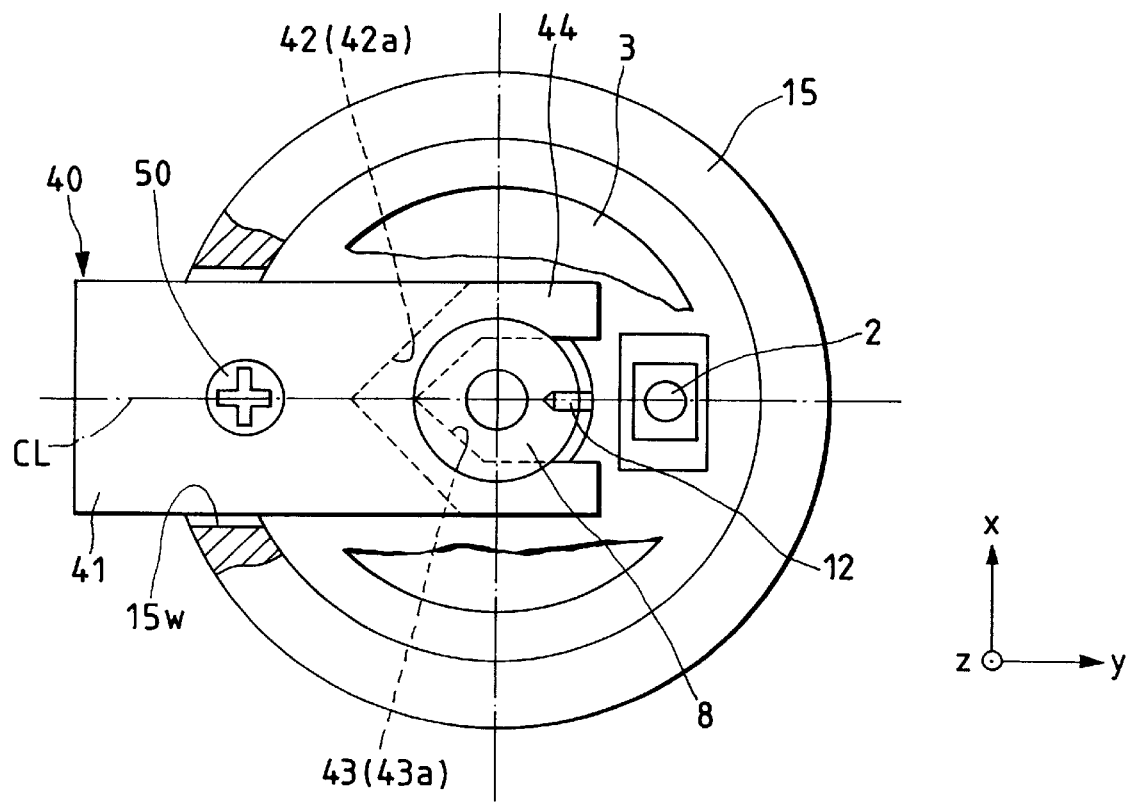
FIG. 13 is a plan view of the encoder from which a sensor board shown in FIG. 12 is removed.
Figure 14:
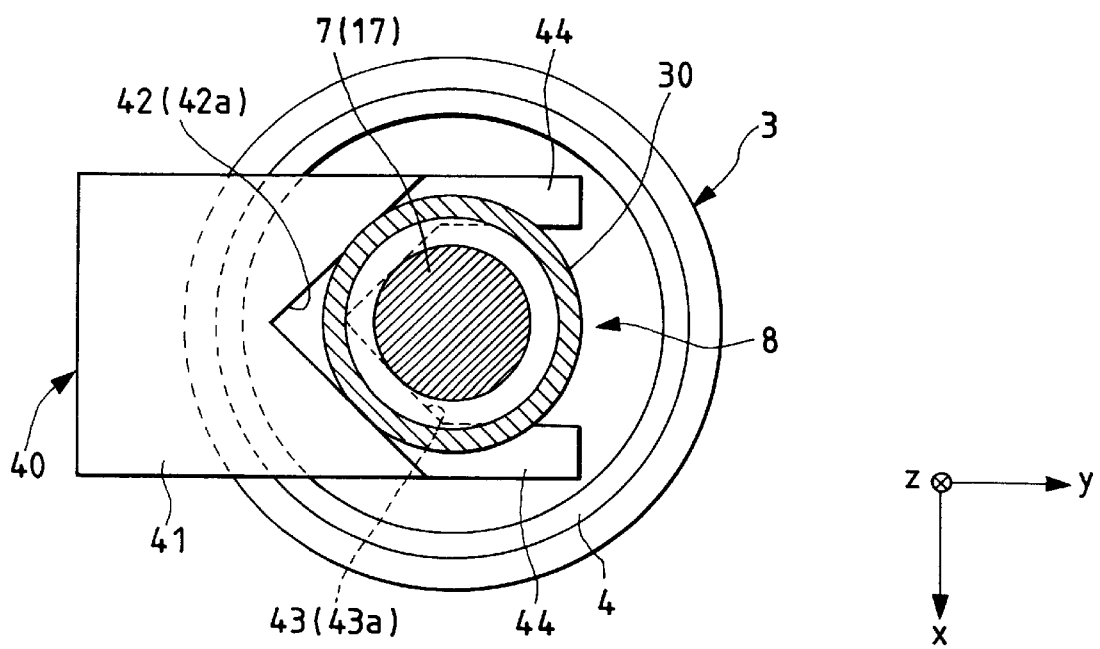
FIG. 14 is an explanatory view showing the engaging relationship between the first recess portion of a block member and the projection of a main body unit shown in FIG. 12, and the engaging relationship between the second recess portion of the block member, and the dummy shaft of a disk unit.

The arrangement of the encoder of this embodiment will be described below. As shown in FIGS. 12 to 14, on the x-y plane, a first recess portion 42 as a first lock portion is formed on the lower portion of the distal end portion of a block member 40 serving as a positioning member, and is locked to a projection 30 as the portion to be engaged, which projects on the base member 15 in the main body unit B, thereby positioning the block member 40 with respect to the main body unit B. In this state, a second recess portion 43 as a second lock member formed on the upper portion of the distal end of the block member 40 is locked to the dummy shaft 7 of the disk unit A, thereby positioning the disk unit A in the rotation shaft direction with respect to the main body unit B. The second recess portion 43 is formed on the upper portion of the distal end portion of the block member 40. A pair of holding pieces 44 as holding portions that substantially form the second recess portion 43 to hold the disk hub 8 in the disk unit A in this state, thereby positioning the disk unit A in the plane direction (x-y plane direction) perpendicular to the rotation shaft direction with respect to the main body unit B. In this state, the block member 40 is fixed to the base member 15 in the main body unit B by a screw 50.

The projection 30 that projects on the base member 15 in the main body unit B is formed into a cylindrical shape, which is formed around the insertion hole 15h of the base member 15, and has an outer circumferential surface, which is a cylindrical surface concentrical with the inner circumferential surface of the insertion hole 15h.

Figure 15A:
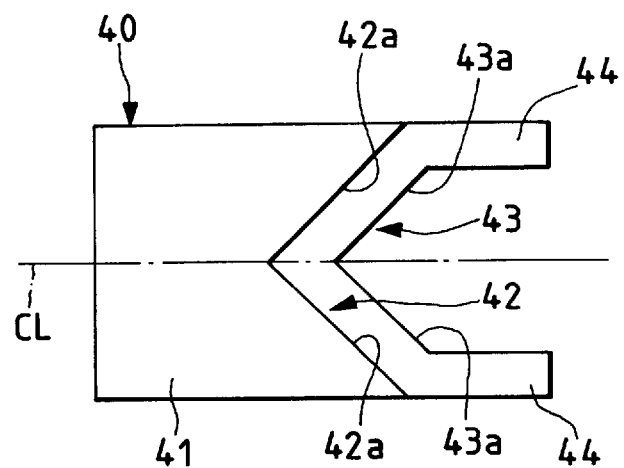
FIG. 15A is a plan view of the block member.
Figure 15B:
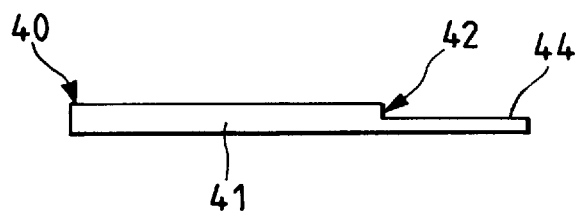
FIG. 15B is a front view of the block member.

As shown in FIGS. 15A and 15B, in the block member 40 serving as the positioning member, the first recess portion 42 is formed by V-shaped walls 42a on the lower portion of the distal end portion of a flat block main body 41, and the second recess portion 43 is formed on the upper portion of the distal end of the first recess portion 42 by the pair of holding pieces 44 having V-shaped walls 43a similar to the V-shaped walls 42a of the first recess portion 42. The first and second recess portions 42 and 43 are formed, so that their V-shaped walls 42a and 43a define a V shape about a common line CL that connects the rotation center of the rotation shaft of the disk unit A and the light source means constituted by the LED 1 and the collimator lens 2 in the main body unit B (see FIGS. 13 and 15A).

In the encoder of this embodiment with the above arrangement, when packing the product, as shown in FIG. 12, the disk unit A and the main body unit B are fixed using the block member 40.

At this time, in order to A- and Z-phase signals detected by the encoder, as has been described in the prior art, decentering of the disk (main scale) 3 and x-axis components of the positional displacement of the flat board (index scale) 5 must be suppressed.

For example, when the disk 3 on which 2,500 slits are recorded as the radial grating 4 on the doughnut-shaped region at a radius of 8 to 12 mm, as described above, is used as the main scale, the displacement in the x-direction must be suppressed to 21 μm or less in terms of detection precision of the rotational displacement of the object to be detected, and this displacement is the strictest value among all the directions.

However, when the disk unit A and the main body unit B are assembled using the block member 40, the displacement in the x-direction can be suppressed to a value that has no influence on the detection precision.

The assembly procedure for assembling the disk unit A and the main body unit B using the block member 40 will be described below.

First, the dummy shaft 7 is attached to the disk hub 8 to adjust decentering of the disk 3. At this time, the disk hub 8 is fixed to the dummy shaft 7 by the set screw 12.

The block member 40 is inserted into the base member 15 in the main body unit B via the insertion port 15w as an opening formed on the x-y plane. At this time, the V-shaped walls 42a of the first recess portion 42 of the block member 40 are butted against the projection 30 of the base member 15 to lock it, thereby positioning the block member 40 with respect to the base member 15 (see FIG. 14).

Subsequently, in the state wherein the first recess portion 42 of the block member 40 is locked to the projection 30 of the base member 15, the outer circumferential surface of the dummy shaft 7a of the disk unit A is butted against the V-shaped walls 43a of the second recess portion 43 of the block member 40 (see FIG. 14), and the block member 40 is fixed in this state to the base member 15 by the screw 50. The lower surface of the disk hub 8 is butted against the upper surfaces of the pair of holding pieces 44 of the block member 40, thereby fixing the disk hub 8 on the block member 40.

With these operations, positioning of the disk unit A in the rotation shaft direction with respect to the main body unit B and positioning of the disk unit A in the plane direction (x-y plane direction) perpendicular to the rotation shaft direction are attained. At this time, it is important to set the disk 3 at the rotary phase position upon detecting a Z-phase signal, i.e., at a position where the amplitude grating 4Z on the disk 3 matches the amplitude grating 5Z on the flat board 5 in the rotation shaft direction of the disk unit A.

Thereafter, the position, on the x-y plane, of the sensor board 9a to which the flat board 5, the sensor unit 6, and the like are integrally attached, is adjusted by a position adjustment mechanism (not shown). With this adjustment, position adjustment for matching the amplitude grating 4 on the disk 3 and the amplitude gratings 5A and 5B on the flat board 5 on the x-y plane is attained, and the sensor board 9a is fixed to the base member 15 by a screw (not shown) at the adjusted position.

The encoder that completes assembly of the disk unit A and the main body unit B is delivered to the user after the set screw 12 is loosened and the dummy shaft 7 is detached from the disk hub 8.

In the encoder of this embodiment in which the disk unit A and the main body unit B are assembled using the block member 40, the butting direction upon positioning the main body unit B and the disk unit A is limited to a direction from the outer circumferential surface of the encoder in the direction of rotation center (y-direction) of the dummy shaft 7 on the side opposite to the side where the light source means (1, 2) opposes the flat board 5, thus assuring easy assembly of the main body unit B and the disk unit A.

A case will be explained below wherein the user attaches the encoder to the coupling shaft (rotation shaft) of the object to be measured such as a motor and uses it. Note that the coupling shaft 17 to which the user attaches the encoder has a shaft diameter different from that of the dummy shaft 7 used during assembly of the encoder.

First, a coupling shaft 17 is inserted into the through hole 8a of the disk hub 8 via the insertion hole 15h of the base member 15, and the outer circumferential surface of the coupling shaft 17 is butted against the second recess portion 43 of the block member 40 fixed by the screw to the main body unit B, thereby positioning the disk unit A and the main body unit B relative to each other. In this state, the set screw 12 is fastened to fix the coupling shaft 17 to the disk hub 8. Thereafter, the main body unit B of the encoder is coupled and fixed to the object to be detected using a coupling/fixing tool (not shown). Finally, the block member 40 is removed from the insertion port 15w of the base member 15, thus completing coupling between the encoder and the object to be detected.

Figure 16:
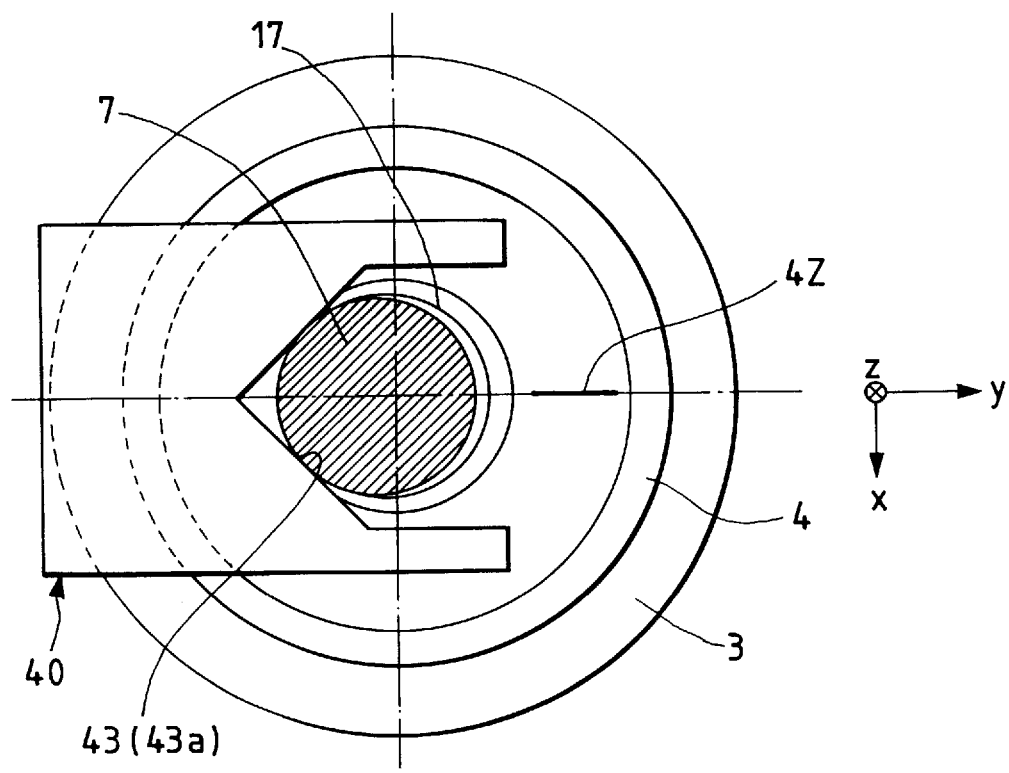
FIG. 16 is an explanatory view showing the engaging relationship between the second recess portion of the block member and the coupling shaft (rotation shaft) of the object to be detected.

In the encoder of this embodiment, which is coupled to the object to be detected, as described above, even when the shaft diameter of the coupling shaft 17 is made different from that of the dummy shaft 7, since the block member 40 is set in the state wherein the V-shaped walls 43a of the second recess portion 43 oppose the origin position detection amplitude grating 4Z on the disk 3, as shown in FIG. 16, the positional displacement of the rotation center of the disk 3 caused by changes in shaft diameter is produced in only the y-direction, and has no influence on synchronizing between the A- and Z-phase signals.

Figure 17:
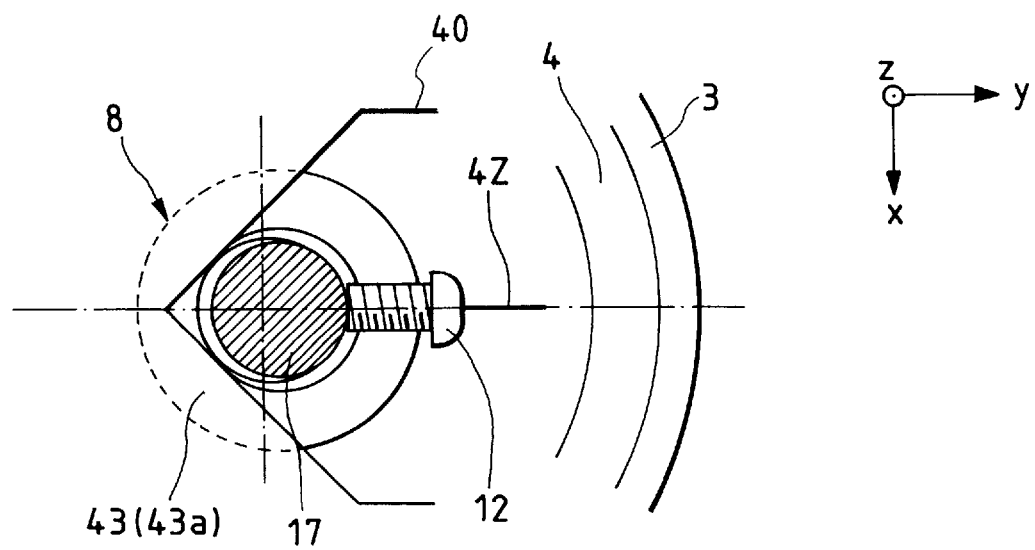
FIG. 17 is an explanatory view of when the coupling shaft (rotation shaft) of the object to be detected, which shaft engages with the second recess portion of the block member, is fixed by a screw.

Also, as shown in FIG. 17, since the rotation shaft 17 is coupled to the disk hub 8 by the set screw 12 from the same direction as the direction of a line (y-direction) that connects the origin position detection amplitude grating 4Z and the center of the disk 3, the influence of decentering upon attaching the disk unit similarly appears in only the y-direction, and is not imposed on synchronizing between the A- and Z-phase signals.

Therefore, in the encoder of this embodiment, upon detecting a Z-phase signal based on the rotary phase of the disk unit A, the A- and Z-phase signals can be stably synchronized without causing any positional displacement in the x-direction (hence, while suppressing the displacement in the x-direction to 21 μm or less).

As for the displacement in the y-direction, since the A-, B-, and Z-phase signals need only be prevented from being mixed, a displacement up to 100 μm is allowed if the track width of the amplitude grating 4 on the disk 3 is, e.g., 200 μm. When the rotary phase of the disk 3 matches the Z-phase detection position, the displacement in the y-direction should be suppressed in term of synchronizing between the A and Z phases.

As described above, with the built-in type encoder of the fifth embodiment, even when the disk 3 in the disk unit A is made compact (to have a smaller diameter) and has a higher resolution, the disk unit A can be easily and highly precisely positioned with respect to the main body unit B using the block member 40 in the rotation shaft direction and the x-y plane direction perpendicular to the rotation shaft direction. Hence, a high-performance, low-cost built-in type rotational displacement information detection apparatus which hardly causes the out-of-phase state of the A- and Z-phase signals, allows easy assembly, and has a small number of parts, can be realized.

The present invention has the above-mentioned arrangements, but is not limited to the above embodiments. For example, the positioning function of the block member 40 in the encoder of the fifth embodiment may be added to the encoder of the second embodiment. Also, the adjustment function in the encoder of the second embodiment may be added to the encoder of the fifth embodiment. In this manner, a rotational displacement information detection apparatus which can easily adjust the distance between the disk and the flat board in the encoder main body when positioning the amplitude grating on the disk and those on the flat board, and can easily attain, with high precision, positioning of the disk unit in the rotation shaft direction and positioning of the disk unit in the plane direction perpendicular to the rotation shaft direction upon assembling the rotatable disk unit to the main body unit, can be realized.

what is claimed is:

1. An apparatus for detecting rotational information, comprising:
    a disk attachable to a spindle, relative rotational information of which is to be detected, said disk having a rotation detection grating;
    a main body unit independent from said disk;
    an optical detection unit fixed in said main body unit, wherein a light source, a reference grating, and a light-receiving element are fixed to said optical detection unit, and where the rotational information of said disk relative to said optical detection unit is detected by said light-receiving element by detecting a light beam which is emitted by said light source and goes via said rotation detection grating and said reference grating; and
    a positioning block for positioning said spindle to be attached to said disk, said positioning block having a first V-shaped portion which is arranged so that slope surfaces thereof are substantially symmetrical about a line that connects a rotation center of said spindle attachable to said disk and said optical detection unit, and said spindle being positioned by putting said spindle on said first V-shaped portion.

2. An apparatus according to claim 1, wherein said disk comprises an origin signal detection index, and where a direction to apply a force for attaching said spindle to said disk substantially agrees with a line connecting the rotation center of said disk and said origin signal detection index.

3. An apparatus according to claim 2, wherein a hub is fixed to said disk, and said spindle is fixed to said disk when said spindle is fixed by a screw to said hub.

4. An apparatus according to claim 3, wherein a screw fastening direction of said spindle substantially agrees with the line connecting the rotation center of said disk and said origin signal detection index.

5. An apparatus according to claim 3, wherein a screw fastening direction of said spindle includes two directions substantially symmetrical about the line connecting the rotation center of said disk and said origin signal detection index.

6. An apparatus according to claim 1, wherein said positioning block is detachably attached to said main body unit so as to be detached after said spindle is attached to said disk.

7. An apparatus according to claim 1, wherein said positioning block comprises an elastic member for temporarily locking a positional relationship between said disk and said main body unit.

8. An apparatus according to claim 1, wherein said first V-shaped portion has a V-shape angle falling within a range from 100° to 130°.

9. An apparatus according to claim 1, further comprising a distance adjustment member for adjusting a distance between said disk and said reference grating.

10. An apparatus according to claim 1, wherein said positioning block further comprises a second V-shaped portion for positioning said positioning block and said main body unit.

11. An apparatus according to claim 10, wherein said first and second V-shaped portions are formed to have a step therebetween.

12. An apparatus according to claim 1, wherein said positioning block further fixes said disk to said main body unit.

13. A method of manufacturing a rotational information detection apparatus comprising a disk which has a rotation detection grating and is attachable to a spindle, relative rotational information of the disk is to be detected, a main body unit independent from the disk, an optical detection unit fixed in the main body unit and in which a light source, a reference grating, and a light-receiving element are fixed, the information detection apparatus detecting the rotational information of the disk relative to the optical detection unit by detecting, by the light-receiving element, a light beam which is emitted by the light source and goes via the rotation detection grating and the reference grating, comprising the steps of:

setting the disk and the optical detection unit in the main body unit; and setting a positioning block for positioning the spindle to be attached to the disk in the main body unit, wherein the positioning block has a V-shaped portion arranged so that slope surfaces thereof are substantially symmetrical about a line that connects a rotation center of the spindle attachable to the disk and the optical detection unit, and the spindle being positioned by putting the spindle on the V-shaped portion.

14. A method of manufacturing a rotational information detection apparatus, the apparatus comprising a disk which has a rotation detecting grating and is attachable to a spindle, relative rotational information of the disk is to be detected, a main body unit independent from the disk, an optical detection unit which is fixed in the main body unit and in which a light source, a reference grating, and a light-receiving element are fixed, the information detection apparatus detecting the rotational information of the disk relative to said optical detection unit by detecting, by the light-receiving element, a light beam which is emitted by the light source and goes via the rotation detection grating and the reference grating, the method comprising the steps of:

positioning the spindle to be attached to the disk using a positioning block arranged in the main body unit, the positioning block having a V-shaped portion arranged so that slope surfaces thereof are substantially symmetrical about a line that connects a rotation center of the spindle attachable to the disk and the optical detection unit, and the spindle being positioned by putting the spindle on the V-shaped portion;

attaching the positioned spindle to the disk; and detaching the positioning block from the main body unit after attachment of the spindle.

15. A method according to claim 14, wherein the disk comprises an origin signal detection index, and where a direction to apply a force for attaching the spindle to the disk substantially agrees with a line connecting the rotation center of the disk and the origin signal detection index.

16. A method according to claim 15, wherein a hub is fixed to the disk, and the spindle is fixed to the disk when the spindle is fixed by a screw to the hub.

17. A method according to claim 16, wherein a screw fastening direction of the spindle substantially agrees with the line connecting the rotation center of the disk and the origin signal detection index.

18. A method according to claim 16, wherein a screw fastening direction of the spindle includes two directions substantially symmetrical about the line connecting the rotation center of the disk and the origin signal detection index.

19. A disk used in a rotational information detection apparatus, the apparatus comprising a disk which has a rotation detection grating and is attachable to a spindle, relative rotational information of the disk is to be detected, a main body unit independent from the disk, an optical detection unit which is fixed in the main body unit and in which a light source, a reference grating, and a light-receiving element are fixed, the information detection apparatus detecting the rotational information of the disk relative to the optical detection unit by detecting, by the light-receiving element, a light beam which is emitted by the light source and goes via the rotation detection grating and the reference grating, said disk comprising:

an origin signal detection index; and a mechanism for attaching a spindle, wherein a direction to apply a force for attaching the spindle by said mechanism substantially agrees with a line connecting a rotation center of said disk and said origin signal detection index.

20. A disk according to claim 19, further comprising a hub, and wherein said mechanism for attaching the spindle has a spindle screw fixing hole formed on said hub.

21. A disk according to claim 20, wherein a direction of the spindle screw fixing hole substantially agrees with the line that connects the rotation center of said disk and said origin signal detection index.

22. A disk according to claim 20, wherein a direction of the spindle screw fixing hole includes two directions substantially symmetrical about the line connecting the rotation center of said disk and said origin signal detection index.

23. An apparatus for detecting rotational information, comprising:

a disk attachable to a spindle, relative rotational information of the disk is to be detected, said disk having a rotation detection grating;

a main body unit independent from said disk;

an optical detection unit fixed in said main body unit, wherein a light source, a reference grating, and a light-receiving element are fixed to said optical detection unit, said reference grating arranged on an elastic member, and the rotational information of said disk relative to said optical detection unit is detected by said light-receiving element by detecting a light beam which is emitted by said light source and goes via said rotation detection grating and said reference grating; and an adjustment mechanism for adjusting a distance between said reference grating and said disk, said adjustment mechanism adjusting the distance by deforming said elastic member.

24. An apparatus according to claim 23, wherein said light-receiving element is also arranged on the elastic member.

25. An apparatus for detecting rotational information, comprising:

a disk attachable to a spindle, relative rotational information of the disk is to be detected, said disk having a rotation detection grating;

a main body unit independent from said disk;

an optical detection unit fixed in said main body unit, wherein a light source, a reference gating, and a light-receiving element are fixed to said optical detection unit, and the rotational information of said disk relative to said optical detection unit is detected by said light-receiving element by detecting a light beam which is emitted by said light source and goes via said rotation detection grating and said reference grating; and a positioning block for positioning said spindle attachable to said disk, said positioning block having an engaging portion with said main body unit, which portion is used for positioning said positioning block and said main body unit, and said positioning block fixing said disk to said main body unit.

* * * * *

UNITED STATES PATENT AND TRADEMARK OFFICE
CERTIFICATE OF CORRECTION

PATENT NO. : 5,883,384

DATED : March 16, 1999

INVENTOR(S) : Kato et al.

It is certified that error appears in the above-identified patent and that said Letters Patent is hereby corrected as shown below:

COLUMN 20:

Line 40, "also" should be deleted.

Signed and Sealed this

Sixteenth Day of November, 1999

*Attest:*

Q. TODD DICKINSON

*Attesting Officer*     *Acting Commissioner of Patents and Trademarks*